United States Patent [19]

Kofink

[11] 4,239,978

[45] Dec. 16, 1980

[54] METHOD AND SYSTEM TO SUPPLY ELECTRICAL ENERGY TO A SELF-CONTAINED ELECTRICAL NETWORK AT MULTIPLE VOLTAGE LEVEL, MULTIPLE POWER RANGE, PARTICULARLY FOR MOBILE APPLICATION

[75] Inventor: Wolfgang Kofink, Aichwald, Fed. Rep. of Germany

[73] Assignee: Robert Bosch GmbH, Stuttgart, Fed. Rep. of Germany

[21] Appl. No.: 6,923

[22] Filed: Jan. 26, 1979

[30] Foreign Application Priority Data

Mar. 9, 1978 [DE] Fed. Rep. of Germany ....... 2810201

[51] Int. Cl.$^3$ .............................................. H02J 1/00
[52] U.S. Cl. .................................. 307/16; 307/10 K; 307/29; 307/71; 322/90; 363/67
[58] Field of Search ..................... 307/9, 10 R, 71, 76, 307/84, 16, 18, 24, 29; 322/89, 90; 363/67-69, 126

[56] References Cited

U.S. PATENT DOCUMENTS

| 3,316,416 | 4/1967 | Carlson | 307/10 R X |
|---|---|---|---|
| 3,571,560 | 3/1971 | Nilssen et al. | 307/10 R X |
| 3,585,358 | 6/1971 | Nilssen | 307/10 R X |
| 3,793,544 | 2/1974 | Baumgartner et al. | 322/90 X |
| 3,984,750 | 10/1976 | Pfeffer et al. | 363/67 |
| 4,009,431 | 2/1977 | Johnson | 363/69 X |
| 4,045,718 | 8/1977 | Gray | 322/90 X |
| 4,100,474 | 7/1978 | Pfeffer et al. | 322/90 X |
| 4,163,187 | 7/1979 | Thomas | 307/76 X |

Primary Examiner—William M. Shoop
Attorney, Agent, or Firm—Frishauf, Holtz, Goodman & Woodward

[57] ABSTRACT

To supply intermittently required high-power loads, such as heater applications in an automotive vehicle, a dual armature winding three-phase alternator has a first or main winding connected to a first or main rectifier bank to supply power to vehicular loads, for example at 12 V nominal level; an auxiliary winding is connected to a rectifier which can be switched to operate as a half-wave rectifier, in parallel with the main winding and main rectifier to supply the ordinary loads when high-power loads are not connected; or to be switched in a full-wave bridge rectifier configuration to provide additional power at elevated voltage, added to the voltage of the rectifier receiving current from the main windings, for example providing $16 \cdot \sqrt{3} = 28$ V added to the nominal supply voltage of 12 V=40 V voltage to the heater load.

13 Claims, 1 Drawing Figure

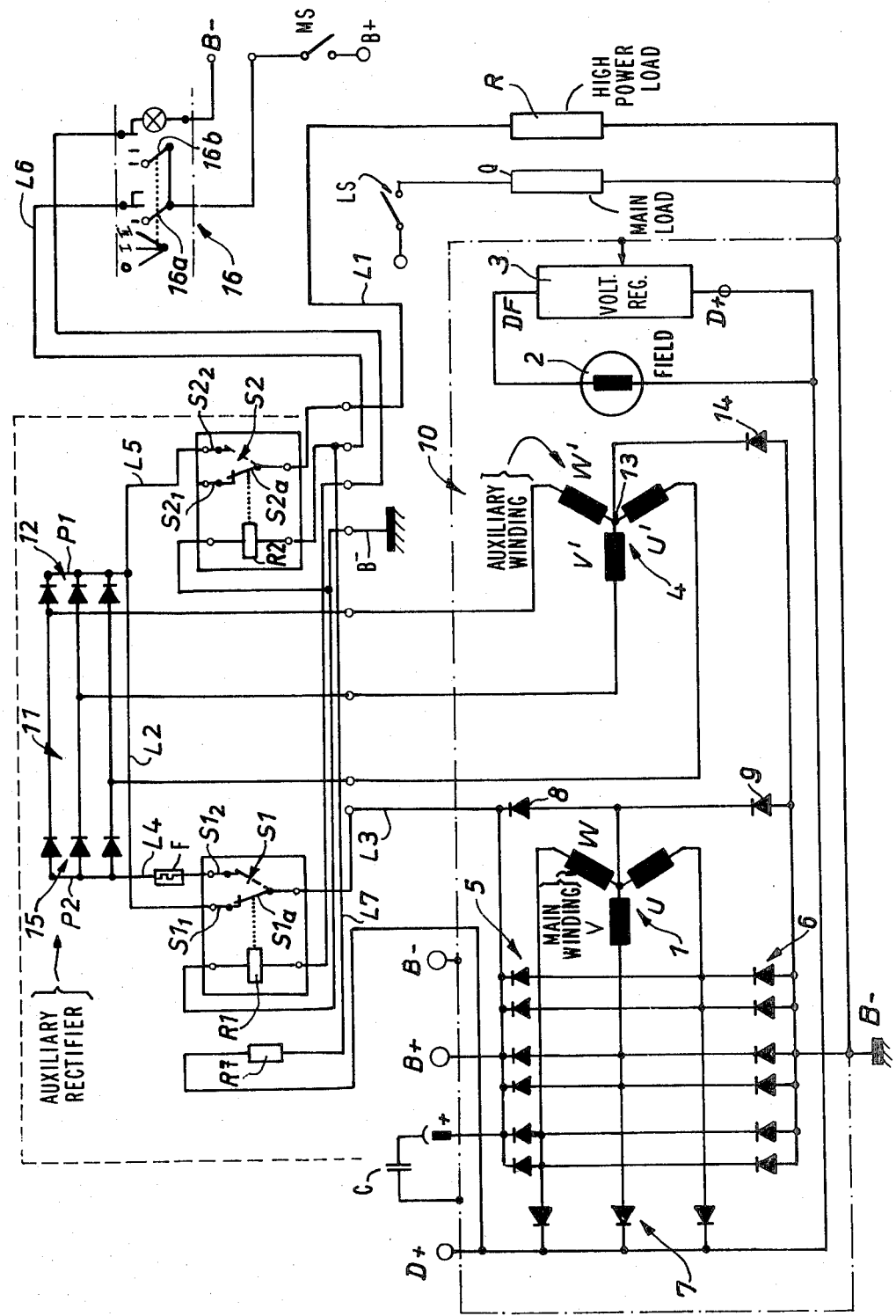

METHOD AND SYSTEM TO SUPPLY ELECTRICAL ENERGY TO A SELF-CONTAINED ELECTRICAL NETWORK AT MULTIPLE VOLTAGE LEVEL, MULTIPLE POWER RANGE, PARTICULARLY FOR MOBILE APPLICATION

The present invention relates to an electrical energy supply network for a self-contained load, for example for vehicular application, typically for automotive, boat and the like electrical supply networks, in which a class of loads receives power at a first voltage level, for example at a nominal voltage of 12–14 V, and a second class of loads, for example peak heater loads at a substantially elevated voltage level, for example 40–42 V.

BACKGROUND AND PRIOR ART

Multiple winding alternators to supply electrical loads are well known. In automotive application it is customary to provide three-phase alternating current generators, driven by the engine of the vehicle. The three-phase output is rectified in a rectifier bank to charge a battery and to supply electrical loads, connected in parallel to the battery through suitable switching arrangements. Voltage is maintained at the proper level for the battery by means of a voltage regulator which may be a solid-state controller, controlling current flow through the field of the alternator in pulses of varying duty cycle so that the voltage output of the alternator is essentially independent of loading thereon or speed of the driving internal combustion (IC) engine.

The increasing electrical loads placed on mobile self-contained electrical supply systems installed, for example, in automotive vehicles, boats, and the like, require supply currents of increasing level. Some loads are particularly demanding of current, for example heaters used for electrical heating of passenger spaces of vehicles, windshield and other window area heaters, air-conditioning apparatus, and the like. The alternator must be so designed that it is capable of supplying electrical currents to all loads, although peak demands thereon, for example for heating or air-conditioning, are placed on the alternator only rarely and seasonally.

It has been proposed to so design the alternator that it has a main winding, the power capacity of which is matched to the normally expected load to be placed thereon, and to wind an additional or auxiliary armature winding on the alternator which is used to supply current for peak demands. This auxiliary winding, in the past, was idle during normal operation. The increased complexity of such an arrangement, and the necessity of providing separate terminals, ground connections and the like, increases the cost of such an arrangement and it is uneconomical to provide such a dual arrangement if the use of the second or auxiliary winding is only occasional or temporary. The main winding of the alternator did not contribute to the energy supply of the additional loads although just at that time the main portion of the alternator may not be loaded to its limit.

THE INVENTION

It is an object to provide a method and a system for a self-contained electrical supply network, typically for mobile use, for example for use in automotive vehicles, on boats, or the like, which result in increased efficiency and permit use of the respective windings of a dual-winding alternator to supply power to the loads under all operating conditions.

Briefly, the auxiliary winding is connected to an auxiliary or second rectifier which, selectively, can be connected either as a half-wave rectifier or as a full-wave bridge rectifier, in which the output voltage is $\sqrt{3}$ times the individual phase voltage. The auxiliary winding is so designed that when the output thereof is rectified in half-wave rectification, it can be connected in parallel with the main winding of the alternator to supply, for example, a nominal output voltage of 12–14 V; when connected to supply a peak load, for example, a heater load, the auxiliary winding is connected to the bridge rectifier so that the voltage thereof is multiplied by $\sqrt{3}$, and additionally connected additively to the main winding so that the overall output of the alternator to supply the peak load will be in the 40–42 V range.

Preferably, the alternator is a three-phase a-c generator, the auxiliary winding being connected to a rectifier which, selectively, is connectable as a half-wave rectifier or as a bridge rectifier, the armature windings being connected in star configuration.

The network arrangement, and its method of connection, has the advantage that both the main winding as well as the auxiliary winding of the generator contribute to the supply of electrical energy and provide a fully integrated electrical energy supply system. During supply of the peak load, typically a heater load, the main winding as well as the auxiliary winding provide energy thereto; the auxiliary winding thus need not be dimensioned to supply all the energy to the auxiliary load and can be made of wire of reduced diameter with respect to prior art structures. Upon disconnection of the peak load, the auxiliary winding as well as the main winding both can be utilized to supply the other loads at the lower voltage levels which can be connected to the alternator; the switch-over network itself is simple and can be controlled directly or by means of a relay.

For heater supply, that is, to supply the peak loads, the voltages of the armature windings are added so that the voltage supply for the peak loads is at a substantially voltage level than that for the remainder of the on-board network. The current—given a certain power input—thus will be substantially less and the supply wires can be dimensioned to be smaller. The main armature winding, in spite of the series connection of the additional armature winding, is still capable of supplying the remaining loads connected thereto in customary manner. The peak loads as well as the other loads connectable to the system have a common ground or chassis connection; no transformers for high voltage operation of the peak loads are necessary, permitting simple construction of the network and economy of components.

Drawings, illustrating a preferred example, wherein the single FIGURE is a schematic circuit diagram of a preferred embodiment of the invention in which the network is supplied from a dual winding, star-connected, three-phase alternator.

The invention will be described in connection with an onboard network for use in an automotive vehicle, although it is applicable to other types of self-contained networks. The alternator to be used can have any suitable well-known form or construction; in a preferred form, the alternator is an inter-digited or claw-pole-type alternator well known in connection with automotive applications.

An alternator has a main armature winding 1, having three phase windings U, V, W. The phase windings are star-connected. The armature windings are preferably located on the stator of the alternator, subjected to a rotating field derived from a rotating field winding 2 which is supplied with electrical energy from a voltage regulator 3, as well known. The field 2 provides electromagnetic energy additionally to an auxiliary winding 4 having individual phase windings U', V', W'. The main winding 1 of the alternator 10 is connected to a rectifier bank having plus-diodes or rectifiers 5 and negative diodes or rectifiers 6, connected in sets, as well known. The output of sets 5, 6 is available at positive and negative terminals B+ and B−. The terminals B+, B− are customarily connected to a storage battery (not shown). They can supply main loads, collectively shown at Q through suitable switches LS. The nominal voltage between terminals B+, B− customarily is about 12 V. This voltage is determined by the design of the alternator 1 and the sets of rectifiers 5, 6. Other voltage levels may be used, as desired. The numerical values for voltages to be discussed herein are all approximate and the example will be given in connection with a nominal 12 V voltage network which, actually, when the battery is fully charged is closer to 14 V. Since the voltage values will fluctuate somewhat, they are to be considered only as approximate. The terminal designations which are customary in automotive vehicles will be used.

The field winding 2 is supplied with electrical power either directly from the terminals B+, B− or, as shown in this example, through separate field diodes 7, the cathodes of which are connected to the common terminal D+ for further connection to the voltage regulator 3. The star or center connection of the armature windings 1 is connected through diodes 8, 9 to the respective terminals B+, B− in order to utilize the rectified third harmonic which is induced in the armature windings.

The auxiliary winding 4 is connected to an auxiliary rectifier 11. This auxiliary rectifier has rectifier sets 12 and 15, connected similarly to the rectifier sets 5, 6 of the main windings to the respective auxiliary windings 4. The output terminals of the rectifier 11 are P1, positive, and P2, negative. Peak heater loads, for example auxiliary interior heaters, windshield, rear window heaters-defrosters, and the like, are collectively illustrated as high-power load R. These are loads which, due to high energy requirement, are not customarily connected directly to the on-board network that is, are lumped together with the load Q. These loads are, usually, essentially resistive. The load R is connected to the common ground or chassis connection B− of the on-board network. The load R is connected to the rectifier 11 through two switches S1, S2. These switches, preferably, are relays having respective relay windings R1, R2, with associated change-over switches S1a, S2a, operating, selectively, between relay terminals S1$_1$, S1$_2$, S2$_1$, S2$_2$, respectively. The switches S1, S2 can also be manually operated by an operator and relay control is not necessary.

The wiring is so arranged that, selectively, the auxiliary winding 4 or, rather, the output of the auxiliary rectifier 11 can be so switched that it is either in series with the output from the main rectifier 5, 6, or in parallel thereto. In the series connection, the current being supplied to the high power load R will flow both through the main winding 1 as well as the auxiliary winding 4 of the alternator 10.

Operation and switch connections: Let it be assumed that the switches S1, S2 are in the solid-line position as shown, that is, the switch arms S1a, S2a are connected to respective terminals S1$_1$ and S2$_1$. The high power load R is disconnected since the connecting L1 between the load R terminates at the switch terminal S2$_1$, which is unconnected or left blank. The other change-over terminal of the second relay switch, that is, terminal S2$_2$, is connected to the positive output terminal P1 of rectifier 11, formed by a parallel connection of the cathodes of the positive diodes 12 of the rectifier 11. The positive terminal P1 is connected to the switch terminal S2$_2$ over a line L5, and a further line L2 connects to the switch terminal S1$_1$ of the first relay. This switch terminal S1$_1$ is connected, in the position shown, to a line L3 which, in turn, is connected to the terminal B+.

Since the high power load R, through line L1, terminates at a blank or unconnected terminal, the high power load R is disconnected or, in the solid-line position as shown in the FIGURE, the high power load is OFF.

In the OFF position, as shown, the connection line L3 connects the terminal B+ of the main rectifier 5, 6 through switch S1a-S1$_1$-line L2 to the positive terminal P1 of the auxiliary rectifier 11. The star terminal 13 of the armature windings of the auxiliary winding 4 is connected through a diode 14 to terminal B− or the chassis or common or reference terminal. Thus, when the high power load R is disconnected or OFF, the rectifiers 12 of the auxiliary rectifier 11 will, effectively, operate as half-wave rectifiers in parallel with the main rectifiers 5, 6 and the main winding 1 as well as the auxiliary winding 4 of the alternator 10 will operate in parallel. The auxiliary winding 4 supplies power at a voltage level corresponding to the respective phase voltages of the auxiliary armature windings U', V', W'. The negative diodes 15 of the auxiliary rectifier 11 are not in operation in the OFF position of the high power load R. They are connected through a line L4 which preferably contains a fuse F to terminal S1$_2$ which, in the solid-line position of the switch S1, is free or disconnected. The auxiliary rectifier 11 thus operates as a half-wave rectifier. The respective windings U', V', W' of the auxiliary winding 4 must be so dimensioned, and the diodes 12 as well as diodes 14 must be so dimensioned that in this connection the voltages of the auxiliary winding 4, as rectified, and of the main winding 1, as rectified, can be connected in parallel with suitable and predetermined load sharing; in other words, the parallel connection of auxiliary winding 4 and main winding 1 is permitted if the voltage across terminals B+, B−, which is $\sqrt{3}$·phase voltage across any winding is essentially equal to the output voltage of the auxiliary winding 4, as rectified and carried through diode 14. The voltage of each one of the phase windings U', V', W' of the auxiliary winding 4 thus must correspond to the full-wave bridge-rectified output voltage across terminals B+, B− of the main winding 1. In the present example, the output voltage of the auxiliary windings, as rectified, may be in the order of about 16 V.

If both relays R1, R2 are energized or, in other words, if switches S1, S2 are changed over to the broken-line position, the voltages derived from the auxiliary rectifier 11 and the main rectifier 5, 6 are added. The connection can be traced as follows: The positive terminal B+ is connected through line L3, switch arm S1a, terminal S1$_2$, line L4 to the negative terminal P2 of rectifier 11, that is, to the common anode connection of the negative diodes 15. The positive terminal P1 of the auxiliary rectifier 11 is connected over line L5, terminal S2$_2$, switch arm S2a, line L1 to the high power load R. The series connection, at the d-c side of the power generated by the windings 1, 4 can be clearly seen. The main windings 1 can supply loads Q, upon closing of the switch LS at the main winding output voltage across terminals B+, B−, the series connection of the winding 1, 4 being effective only on the high power load R. The auxiliary rectifier 11 operates in the customary three-phase bridge connection with active negative diodes 15 and positive diodes 12. The voltage between the terminal P1, P2 will be the composite voltage of the additional windings 4, that is, about $16 \cdot \sqrt{3} = 28$ V (approximately). The voltage across the high power load R then will be $14 + 28 = 42$ V (approximately) assuming an on-board voltage of about 14 V. A typical windshield or window defroster resistance, overall, is about 3 ohms. The power supplied then will be over about 500 W, requiring a current of between 12 to 14 A. The main winding 1 thus must be dimensioned for supply of the current required for the loads other than the high power load R+12 to 14 A; the auxiliary winding 4 can be dimensioned to supply only 12 to 14 A. The additional current of 12 to 14 A can usually be accepted by the wire customarily used with the main windings 1 of standard automotive-type alternators; the additional loading being placed on the main winding is in the order of 150 W. It should be stressed again that all these values are approximate since variations are to be expected depending on the voltage supplied at any instant, overall loading, speed of the engine and the like. The voltage of the auxiliary winding 4 also may vary, and since the wire size thereof will be less than that of the main winding 1, its regulation will have an effect on voltage levels.

A third switching position is possible, in which switch S1 is in the position shown in the drawing, that is, switch S1 is in the position in which switch arm S1a is connected to terminal S1₁, while switch S2 is in the broken-line position. Switch S1 is thus in the parallel mode, in which the windings 1 and 4 are connected in parallel. Change-over of switch S2, however, provides a closed circuit between the high power load R through line L1 and switch arm S2a, terminal S2₂, line L5, line L2 to switch terminal S1₁ and then through switch arm S1a, line L3 to the positive supply B+ of the electrical network system, now connected in parallel. The high power load R is then connected to the on-board network at the voltage level between terminals B+, B−, in the assumed example about 14 V (12 V nominal); if the resistance of load 3 is, as assumed, about 3 ohms, the power supplied to the high power load R will be about 70 W. This load supply may correspond to a hold-warm or "low" position.

Switches S1, S2 preferably are relay switches, as shown, changed over by energization of respective relay coils R1, R2. A separate control switch 16 is provided, energizing the relay coils R1, R2 with power derived from the main power supply, that is, at the voltage level B+. The switch 16 has two switch arms 16a, 16b of respectively three positions, connected as shown. The switch 16 is connected, for example, through a main vehicular switch MS to the B+ terminal. Switch MS may, for example, be the ignition switch of the vehicle. The three positions of switch 16 are: O—OFF; I—LOW; and II—HIGH HEAT. Upon closing of main switch MS, battery voltage is supplied to switch arms 16a, 16b. In switch position O, both relay coils R1, R2 are de-energized. The switches S1, S2 are held, for example by spring pressure, in the full-line position as shown and the windings 1, 4 with the rectifiers 5, 6 and 11, operate in parallel mode, the negative rectifier bank 15 of rectifier 11 being, effectively, disconnected. Upon changing of switch 16 to the I position, line L6 is the only line which is energized, causing energization only of relay coil R2 and change-over of switch S2, providing low-voltage supply to the high power load R. Upon change of the switch 16 to the II position, both relay coils R1 and R2 are energized, and both switches S1, S2 will change over, providing for high power operation of the high power load R, as described. Preferably, an indicator lamp is connected to the II position of the switch 16 to provide an output indication.

In a preferred, although not necessary form, a resistor R7 is connected to the relay winding R2 through a connecting line L7 and further to the D+ connection of the field rectifiers 7. This connection ensures reliable self-excitation of the alternator during heater operation, after starting, since the alternator is loaded already as the engine is being started if the high power load R is connected and thus self-excitation of the alternator can be impaired unless additional power is supplied to the field. The resistor R7 provides a power boost to the field which is effective upon starting, that is, when the alternator is driven from the engine at only very low speeds.

The capacitor C is preferably connected between the terminals B+, B− to provide for smoothing of switching peaks.

The basis for the present system is the addition of rectified voltages for peak operation, that is to supply the high power load R but, upon disconnection of the high power load R or, rather, upon disconnection of high power requirements for the high power load R, to connect the auxiliary winding 4 in parallel with the main winding 1. Series connection of the auxiliary windings coupled with the additional change in connection of the rectifier connected to the auxiliary winding permits application of substantially higher voltages to the high power load R, and a voltage which is substantially higher than that which can be obtained by mere series connection of two similar armature windings of an a-c alternator. Still, however, the auxiliary winding can be connected in parallel with the main winding to contribute power output and current to the electrical supply of the on-board network at the nominal network voltage. This is made possible by so connecting the auxiliary winding 4 and its associated rectifier 11 in such a manner that the auxiliary rectifier operates either as a multi-phase bridge rectifier, or as an auxiliary half-wave rectifier, as shown in the star connection in which the phase voltages of the star connected auxiliary windings only are utilized.

Various changes and modifications may be made and the invention is equally applicable to alternators other than a three-phase alternator 10, as shown.

I claim:
1. In a self-contained electrical network having an a-c generator (10) having two groups of armature windings (1—U, V, W; 4—U', V', W');
   two groups of rectifiers (5, 6; 11), one each being connected to a respective armature winding group to provide respective d-c outputs,
   a method of supplying electrical energy at multiple voltage levels in multiple power ranges comprising, in accordance with the invention, the steps of selectively connecting the d-c outputs of the rectifier groups in series;

supplying a first load (Q) from a first group of rectifiers (5, 6) associated with a first group of armature windings (1) at a voltage level which is determined by the rectified voltages from the windings (1) associated with said first rectifier group;

supplying a second load (R) from the series connected first and second rectifier groups (5, 6; 11) and hence at a voltage level which is the sum of the rectified voltages from said first and second groups of windings (1, 4);

and, upon disconnection of the second load (R), connecting said second rectifier group (11) in parallel with said first rectifier group (5, 6) to supply the first load (Q) with power derived from both said windings (1, 4) and from both said rectifier groups.

2. Method according to claim 1, wherein said second group of rectifiers (11) is selectively connectable as a half-wave rectifier or as a bridge rectifier;

said method comprising the steps of
connecting said second rectifier in bridge rectifier configuration when adding the voltages of said second armature winding (4) to the voltage of the first rectifier (5, 6) connected to the first armature winding, and connecting said rectifier (11) in half-wave rectifier configuration when connecting said second rectifier in parallel with said first rectifier to obtain, in the adding connection mode, a voltage which is that of the rectified first winding plus the full-wave rectified voltage of the second winding and, upon operation in the parallel mode, a voltage from the second rectifier which is approximately that of the rectified output voltage of the first winding to permit parallel operation of said winding at essentially the same d-c voltage level and predetermined load sharing.

3. Method according to claim 1, wherein the a-c generator is a three-phase generator and three armature windings are provided;

and wherein the second of said groups of rectifiers is selectively connectable as a three-phase half-wave rectifier or as a bridge rectifier, said method comprising the steps of
connecting said second rectifier in bridge rectifier configuration when adding the voltage of said second armature winding (4) to that of the first rectified armature winding and connecting said second rectifier in half-wave rectifier configuration when connecting said second rectifier in parallel with said first rectifier to obtain, in the adding connection mode, a voltage which is that of the rectified first winding plus $\sqrt{3}$ times the voltage of the second winding and, upon operation in parallel mode, a voltage from the second rectifier which is approximately that of the first rectifier to permit parallel operation of said windings at the d-c output with predetermined load sharing.

4. Method according to claim 2, wherein said windings are star-connected.

5. Self-contained multiple-voltage, multiple-power range electrical energy supply network system having
an a-c generator (10) having two groups of armature windings (1—U, V, W; 4—U', V', W');
two groups of rectifiers (5, 6; 11), one each being connected to a respective armature winding group to provide respective d-c outputs,
and comprising, in accordance with the invention,
switch means (LS; S1, S2) connecting the d-c outputs of the rectifiers in series and supplying a first load (Q) from the first group of rectifiers (5, 6) at a voltage level which is determined by the rectified voltage from the first winding group (1) associated with the first rectifier group (5, 6), and supplying a second load (R) from the series connected first and second rectifier groups and hence at a voltage level which is the sum of the rectified voltages from the first and second groups (1, 4) of the windings;

and, further, selectively permitting disconnection of the second load (R) and then connecting said second rectifier group (11) in parallel with said first rectifier group (5, 6) to supply the first load (Q) with power derived from both said groups of windings (1, 4) and from both said groups of rectifiers (5, 6; 11).

6. System according to claim 5, wherein said second group of rectifiers (11) is interconnected with at least part of said switch means (S1, S2) to provide, selectively, for operation as a half-wave rectifier or as a full-wave bridge rectifier.

7. System according to claim 5, wherein said a-c generator is a three-phase generator and both said winding groups have three armature phase windings, each;
and wherein said second of said groups of rectifiers is selectively connectable with at least part of said switch means (S1, S2) as a three-phase half-wave rectifier, or as a three-phase bridge rectifier;
said switch means, respectively, connecting said second rectifier in bridge rectifier configuration when adding the rectified voltages of said second armature winding (4) to the rectified voltages of the first armature winding (1),
and selectively connecting said second rectifier (11) in half-wave rectified configuration when connecting said second rectifier in parallel with said first rectifier group (5, 6) to obtain, in the adding connection mode, a voltage which is that of the rectified first winding plus $\sqrt{3}$ times the voltage of the second winding, the armature windings of the second winding being dimensioned to provide an output voltage which, when operating in the parallel mode, provides a voltage from the second rectifier operating in half-wave configuration which is approximately that of the first rectifier group to permit parallel operation of said windings at the d-c level with predetermined load sharing.

8. System according to claim 7, wherein the second winding group (4) is star-connected;
and a diode (14) connecting the star point (13) of the second armature windings to the ground, chassis or reference terminal of the rectifier group (5, 6) of said first group of windings (1).

9. System according to claim 5, wherein said switch means includes two transfer switches (S1, S2);
said second group of rectifiers comprises a group of positive rectifiers (12) connected to a positive terminal output; a group of negative rectifiers (15) connected to a negative output, the junction between said groups of rectifiers (12, 15) being connected to respective second windings of the generator;
and wherein said switch means, in a first, or rest position connect said positive terminal (P1) of the second rectifier group to the positive terminal (B+) of the first rectifier group (5, 6) and additionally disconnect the negative rectifier (15) from the network.

10. System according to claim 9, wherein the switch means additionally disconnect the second load (R) from the network.

11. System according to claim 5, wherein at least some of the switch means (S1, S2) are relay switches.

12. System according to claim 9, wherein the a-c generator is a three-phase generator, and the winding groups each have three armature windings;

the second of said groups of rectifiers (11) is selectively connectable as a three-phase half-wave rectifier or as a three-phase bridge rectifier;

said transfer switches (S1, S2) are relay switches, and a control switch (16) is provided controlling said relay switches to effect connection:

(a) connecting said second rectifier (11) in bridge rectifier configuration, connecting the negative terminal of the bridge rectifier to the positive terminal of said first group of rectifiers, and the positive terminal of said bridge rectifier of the second group of rectifiers to the second load to provide an effective voltage to the second load of the rectified voltage of the first group of windings (1) plus $\sqrt{3}$ times the voltage of the second group of windings (4), current flow of the power being delivered to said second load (R) being through both said groups of windings (1, 4), (b) selectively connecting said second group of rectifiers in half-wave rectifier configuration and connecting the positive terminal of the second group of rectifiers to the positive terminal of the first group of rectifiers (5, 6), and said groups of windings (1, 4) in parallel;

(c) selectively connecting said second group of rectifiers in half-wave rectifier configuration and connecting the positive terminal of the second group of rectifiers to the positive terminal of the first group of rectifiers (5, 6), and said groups of windings (1, 4) in parallel;

and additionally connecting said second load (R) across the outputs of said first group of rectifiers and said second group of rectifiers connected in half-wave rectification mode.

13. System according to claim 12, further including a bleeder resistor (R7) providing a connection between the output of the first group of rectifiers (5, 6) and the field winding (2) of the a-c generator when said transfer switches (S1, S2) are controlled by said switch means (16) upon setting of said switch means in either of the modes (b) or (c) as defined in claim 12.

* * * * *